United States Patent [19]

Morris et al.

[11] Patent Number: 5,736,228
[45] Date of Patent: Apr. 7, 1998

[54] DIRECT PRINT FILM AND METHOD FOR PREPARING SAME

[75] Inventors: Terry L. Morris, Eagan, Minn.; William A. Neithardt, Ridgefield Borough, N.J.

[73] Assignee: Minnesota Mining And Manufacturing Company, St. Paul, Minn.

[21] Appl. No.: 581,324

[22] Filed: Dec. 29, 1995

Related U.S. Application Data

[60] Provisional application No. 60/007,064, Oct. 25, 1995.

[51] Int. Cl.⁶ .................................................... B32B 3/00
[52] U.S. Cl. .......................... 428/195; 428/201; 428/204; 428/209; 428/323; 428/343; 428/432; 428/500; 428/697; 428/913
[58] Field of Search ............................... 359/359, 360; 428/201, 207, 209, 210, 336, 432, 433, 434, 469, 470, 697, 913, 323, 343, 204, 500

[56] References Cited

U.S. PATENT DOCUMENTS

| | | | |
|---|---|---|---|
| Re. 33,353 | 9/1990 | Heinecke | 428/40 |
| 2,973,826 | 3/1961 | Barnhart | 182/91 |
| 3,389,827 | 6/1968 | Abere et al. | 220/53 |
| 3,634,135 | 1/1972 | Akiyama | 117/221 |
| 4,112,213 | 9/1978 | Waldman | 526/279 |
| 4,310,509 | 1/1982 | Berglund et al. | 424/28 |
| 4,323,557 | 4/1982 | Rosso et al. | 424/28 |
| 4,374,895 | 2/1983 | Yasuda et al. | 428/328 |
| 4,431,764 | 2/1984 | Yoshizumi | 524/409 |
| 4,732,808 | 3/1988 | Krampe et al. | 428/355 |
| 4,795,676 | 1/1989 | Maekawa et al. | 428/328 |
| 4,880,703 | 11/1989 | Sakamoto et al. | 428/378 |
| 4,904,557 | 2/1990 | Kubo | 430/56 |
| 4,917,929 | 4/1990 | Heinecke | 428/41 |
| 4,965,137 | 10/1990 | Ruf | 428/432 |
| 5,114,520 | 5/1992 | Wang, Jr. et al. | 156/240 |
| 5,141,790 | 8/1992 | Calhoun et al. | 428/40 |
| 5,182,159 | 1/1993 | Yamauchi et al. | |
| 5,192,613 | 3/1993 | Work, III et al. | 428/363 |
| 5,229,207 | 7/1993 | Paquette et al. | 428/355 |

(List continued on next page.)

FOREIGN PATENT DOCUMENTS

| | | |
|---|---|---|
| 0 051 935 A2 | 5/1982 | European Pat. Off. .......... A61F 13/02 |
| 0 454 233 A1 | 10/1991 | European Pat. Off. . |
| 60-211465 | 10/1985 | Japan . |
| 61-213851 | 9/1986 | Japan . |
| 61-246752 | 11/1986 | Japan . |
| 61-279860 | 12/1986 | Japan . |
| 62-262051 | 11/1987 | Japan . |
| 63-40158 | 2/1988 | Japan . |
| 63-184758 | 7/1988 | Japan . |
| 1-254965 | 10/1989 | Japan . |
| 3-69960 | 3/1991 | Japan ................ G03G 5/02 |
| 3-156464 | 7/1991 | Japan . |
| 4-194860 | 7/1992 | Japan . |
| 4-204455 | 7/1992 | Japan . |
| WO 94/25262 | 11/1994 | WIPO . |

OTHER PUBLICATIONS

Derwent Abstract of Japanese Patent Publication 62–018564 undated.

Capano et al., "The Application of ZELEC ECP in Static Dissipative Systems" (DuPont Chemicals, Deepwater, New Jersey) Sep. 1992.

Versatec Training Manual, "Electrostatic writing princples", Module 2, section 2, p. 6 (Jun. 6, 1991).

*Primary Examiner*—William Krynski
*Attorney, Agent, or Firm*—Gary L. Griswold; Walter N. Kim; John H. Hornickel

[57] ABSTRACT

This invention discloses a film and a method for forming a film that can be printed directly using electrostatic priming processes, eliminating the need for transfer of electrostatic images from an electrostatic paper to a polymeric film. The film is durable and conformable to a variety of surfaces and optionally has a field of pressure sensitive adhesive thereon for adhering to such variety of surfaces.

20 Claims, 1 Drawing Sheet

U.S. PATENT DOCUMENTS

| | | | |
|---|---|---|---|
| 5,262,259 | 11/1993 | Chou et al. | 430/47 |
| 5,269,970 | 12/1993 | Ruf et al. | 252/518 |
| 5,296,277 | 3/1994 | Wilson et al. | 428/40 |
| 5,320,781 | 6/1994 | Stahlecker et al. | 252/518 |
| 5,350,448 | 9/1994 | Dietz et al. | 106/441 |
| 5,395,678 | 3/1995 | Matsushima et al. | 428/201 |
| 5,427,835 | 6/1995 | Morrison et al. | 458/96 |
| 5,536,447 | 7/1996 | Pfaff et al. | 252/18 |

DIRECT PRINT FILM AND METHOD FOR PREPARING SAME

This application claims benefit of U.S. Provisional Patent Applicaton No. 60/007,064, filed Oct. 25, 1995, now abandoned.

FIELD OF THE INVENTION

This invention relates to films that are capable of receiving images directly deposited by electrostatic or electrographic processes and methods for preparing such films.

BACKGROUND OF THE INVENTION

The terms "electrostatic" or "electrographic" are used generally interchangeably for recording processes in which a recording head is utilized to impose an electrostatic pattern upon a recording medium, and in which a toner material is subsequently attracted to, and affixed to the electrostatic pattern. Processes of this type are employed for preparing engineering graphics, artwork for advertisements, displays and the like.

In a typical electrostatic imaging process, a recording head which includes a linear array of a plurality of separately chargeable electrodes, generally referred to as "nibs", is scanned across a recording medium, and the nibs are selectively energized to impose an electrostatic pattern upon the medium. The charged medium is contacted with a toner, which typically comprises a liquid containing a pigment or dye thereon. Excess toner is removed from the medium, leaving toner only in the charged areas. The toner is subsequently dried or otherwise fixed to produce a permanent image. The process can be utilized for single color or full color graphics and can be completed in a single pass across the medium or in multiple passes across the medium.

The recording medium is an important component of the electrostatic imaging system. The medium must be able to accept, retain, and discharge the electrostatic pattern. The medium must also be compatible with the toner system employed as well as the particular imaging hardware, such as a single or multiple pass electrostatic printer.

Electrostatic printing of media conventionally requires the printing of electrostatic images on a dielectric paper construction followed by transfer of that image to polymer films. Such conventional electrostatic imaging is disclosed in U.S. Pat. No. 5,114,520 (Wang et al.).

The dielectric paper construction typically comprises a paper or paper-like substrate, a conductive layer coated on a major surface of the substrate, a dielectric layer coated over the conductive layer, and a release layer coated above, beneath, or with the dielectric layer to assure that the image received above the dielectric layer can be transferred to the final substrate upon application of heat and pressure. A commercially available example of this transfer process and the products to accomplish that process is the Scotchprint™ Electronic Graphics System available from Minnesota Mining and Manufacturing Company of St. Paul, Minn.

Japanese Kokai Publication No. 3-69960 discloses a electrostatic image recording adhesive sheet that can print electrostatic images directly. But this publication does not disclose the composition of conductive coatings and dielectric coatings sufficiently to achieve a commercial product capable of assured reproducibility. In addition, it teaches that emulsion coatings should be employed for polyvinyl chloride films, which tend to swell when brought into contact with organic solvents.

SUMMARY OF THE INVENTION

The art needs a process that can avoid the necessity of printing an image on a temporary substrate and then transferring that image to a permanent substrate.

The art also needs a direct print film that can be used to produce lasting, durable images on a permanent, durable substrate.

The art also needs a direct print film that can be prepared without swelling the substrate but that permits the film to be conformable.

One aspect of the present invention is the construction of a film for the direct printing of electrostatic images.

In one aspect, the direct print film comprises a durable, conformable, polymeric substrate having a conductive layer prepared from a coating solution comprising conductive pigment and organic solvent.

"Durable" means the substrates useful in the present invention are capable of withstanding the wear and tear associated with signage and may be used 2 to 5 years in exterior environments.

"Conformable" means the substrates in a direct print film are capable of conforming to uneven surfaces and retaining such conformation during use without significant force applied per unit area of the film. Typically the conformable substrate can be adhered with hand pressure and conform to a surface having periodic or compound irregularities, such as a rivet or welded ridge on the exterior metallic surface of a tractor trailer, without the substrate lifting from the surface. Preferably, a conformable substrate in a direct print film exhibits a yield point and/or permanent strain when subjected to a maximum tensile stress of about $3.5 \times 10^7$ N/m$^2$ (5000 lbs./square inch) at room temperature according to ASTM D638-94b (1994), when the caliper used for the test includes the total cross-sectional thickness of the substrate, the thickness of the adhesive, and the thicknesses of the conductive layer and dielectric layer.

In another aspect, the direct print film comprises a vinyl-containing polymeric substrate having a conductive layer coated thereon from organic solvent, wherein the conductive layer comprises a carboxylated acrylic binder and a conductive pigment comprising antimony and tin oxide.

In another aspect, the direct print film comprises a durable, conformable, polymeric substrate having on a major surface a conductive layer coated thereon from an organic solvent, and a dielectric layer coated on the conductive layer, wherein the conductive layer comprises a conductive pigment comprising intimately mixed antimony and tin oxide.

Preferably, the conductive pigment in the conductive layer has a bulk powder resistivity ranging from about 2 to about 15 Ohm-cm.

"Bulk powder resistivity" means electrical resistivity of the bulk powder used in the conductive pigment according to the following test described by E. I. DuPont, one of the commercial suppliers of conductive pigments. As described in Capano et al., "The Application of ZELEC ECP in Static Dissipative Systems" (Du Pont Chemicals, Deepwater, N.J. September 1992), a cylindrical cell, with electrodes at the top and bottom is used to make bulk powder resistivity measurements. A weighed amount of powder is placed into the cell and then pressed with a laboratory press into a pellet. The resistance between the two electrodes is then measured as a function of the pressure applied and the thickness of powder pellet. The bulk powder resistivities of Du Pont conductive pigments commonly range from about 2 Ohmera to about 20 Ohm-cm according to this test. Another supplier of conductive pigments, Goldschmidt A. G. of Essen, Germany, identifies bulk powder resistivity as "specific resistance" and employs a test method available from Esprit Chemical Company of Rockland, Md. For purposes of this application, the property of "bulk powder resistivity" includes the concept of the property of "specific resistance".

In another aspect, the direct print film comprises a durable, conformable, polymeric substrate having on a major surface a conductive layer coated thereon, and a dielectric layer coated on the conductive layer, wherein the dielectric layer includes spacer particles and abrasive particles. Spacer particles, which are generally of a lower hardness than abrasive particles and/or have a more rounded configuration than abrasive particles, function to provide a roughness that maintains a relatively small gap between the imaging head of the electrostatic printer and the remaining surface of the direct print film. Abrasive particles function to provide abrasivity to contact the imaging head of the electrostatic printer in order to clean oxidation and other unwanted debris from the imaging head.

Optionally, the direct print film has a field of pressure sensitive adhesive coated on the other major surface of the direct print film, protected by a release liner. The field of pressure sensitive adhesive permits the direct application of the film having an image printed thereon to be adhered to a final location.

Another aspect of the invention is a method for preparing electrostatic print film.

A feature of the present invention is the ability to directly print electrostatic images on film of the present invention while concurrently maintaining the imaging heads in an acceptable condition.

Another feature of the invention is ease of construction of a direct print film.

An advantage of the present invention is the ability to eliminate manufacturing steps for the preparation of electrostatic images on a final substrate.

Another advantage of the present invention is the ability to provide for electrostatic direct printing a film that has a surface resistance in its conductive layer of about $2 \times 10^5$ to about $3 \times 10^6$ Ohms/□ and that has a surface resistance in its dielectric layer of greater than about $1 \times 10^8$ Ohms/□. This difference in surface resistance results in clear, crisp images generated by the electrostatic printer.

"Surface Resistance" is the measure of D-C resistance of moderately conductive materials according to ASTM Test Designations D 4496-87 and D 257-93 and is important to films of the present invention to characterize electrical performance of the conductive layer of the present invention, which layer functions as the ground plane of the capacitor, that is being formed by the direct print film of the present invention during electrostatic printing.

Another advantage of the present invention is the ability to provide a direct print film where the conductive layer and the dielectric layer are both compatible with the substrate.

Another advantage of the present invention is the ability to provide a direct print film that when imaged can provide an average color density of from about 1.2 to about 1.5 optical density units using a reflection densitometer.

"Color Density" is the measure of the intensity of the individual primary colors produced by the electrostatic printer on the recording medium to form the latent image and is important to films of the present invention because color density has a major impact upon the perceived aesthetics of the image on the recording medium produced electrostatically.

Another advantage of the present invention is that the direct print film of the present invention provides a durable image.

Embodiments of the invention are described in relation to the following drawings.

EMBODIMENTS OF THE INVENTION

Figure 1:
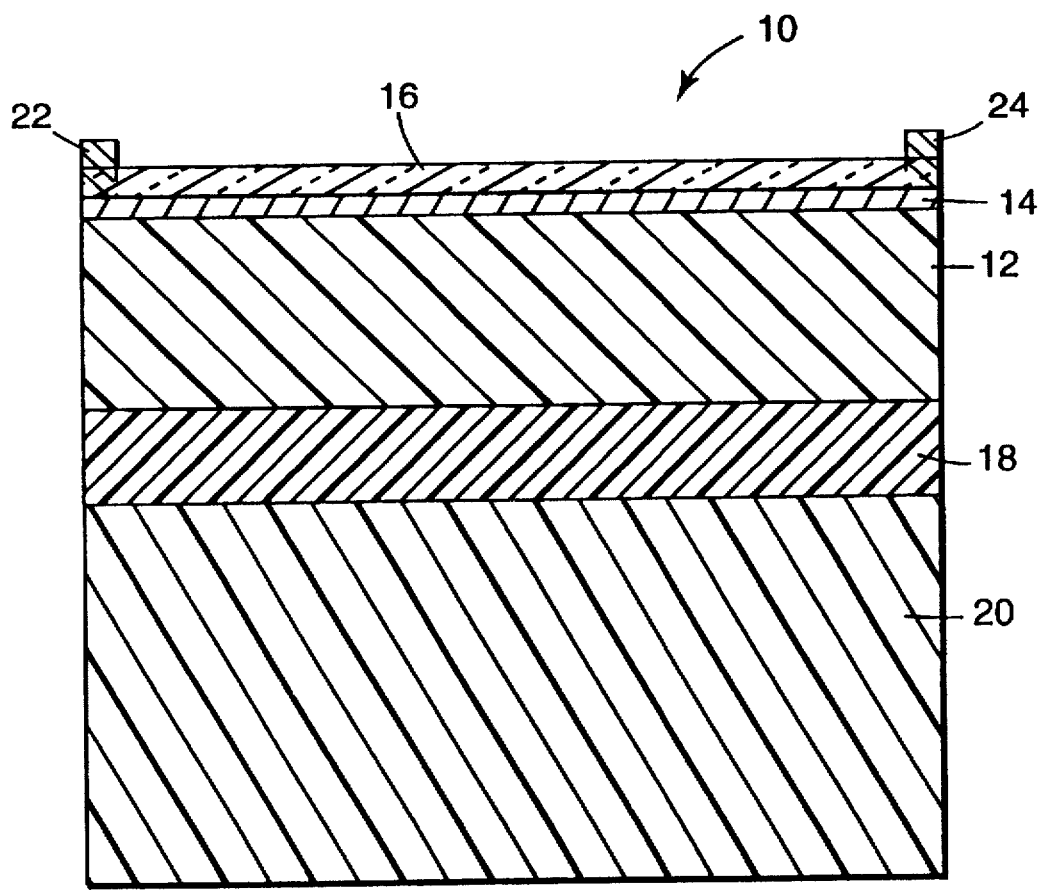
FIG. 1 is a cross-sectional view of the film of the present invention.

Referring to FIG. 1, a typical construction of a film of the present invention 10 comprises a substrate film 12 having on a major surface thereof, a conductive layer 14 and a dielectric layer 16. On the opposite major surface of film substrate 12 resides optional pressure sensitive adhesive 18 protected by a release liner 20.

Substrates

Substrates are preferably a durable material that resists any swelling or other loss of continuity when coated with the conductive layer and also resists deleterious effects of exterior signing environments including large ambient temperature ranges −60° C. to +107° C., direct exposure to sun and is also conformable for fixing to exterior surfaces wherein it may be adhered over surfaces with some compound curvature or non uniformity, e.g. walls or surfaces with screw heads or rivets slightly proud of the surface without easily tipping the material or "tenting". However, in some aspects of the invention, the substrate need not be limited to these durable, conformable substrates. A less durable plastic is useful for interior signing applications.

Substrates can be clear, translucent, or opaque depending on the application of the invention. Opaque substrates are useful for viewing an image from the image side of the printed sheet in lighting conditions such as artificial lighting or sunlight. Translucent substrates are particularly useful for backlit usages, for example, a luminous sign.

Substrates useful in the practice of the present invention are commercially available and many are designed to be exterior durable, which is preferred. Nonlimiting examples of such substrates include Scotchcal™ Marking Films and Scotchcal™ Series 9000 Short-Term Removable (STR) Film available from 3M Company, Avery™ GL™ Series Long Life Films, Avery™ XL™ Series Long Life Films, Avery™ SX™ Series Long Life Films, suitable films from the FasCal™ or FasFlex™ range of films or any other suitable marking, graphic or promotional films available from Fasson, Avery or Meyercord. However, other manufacturers of suitable materials exist and the invention shall not be limited to the above. Almost any material composed of a plastic sheet could be used depending on the use of the final image, for example, whether outdoor durability is required, and providing that the conductive layer can adhere to the film surface sufficiently well.

Useful substrates can have a variety of surface finishes such a matte finish as provided with Scotchcal™ Series 9000 Short-Term Removable (STR) Film or glossy finish as provided with Scotchcal™ 3650 Marking Film. Plastic films can be extruded, calendared or cast different plastic materials may be used, such as those exemplified by the Scotchcal™ plasticized poly(vinyl chloride) or Surlyn, an ionomer. Any suitable plastic material can be employed. Nonlimiting examples include polyester materials exemplified by Mylar™ available from E. I. Du Pont de Nemours & Company, Melinex™ available from Imperial Chemicals, Inc., and Celanar™ available from Celanese Corporation. Preferred materials for substrates can include those that are plasticized poly(vinyl chloride)s or ionomers although the invention is not limited to these. Preferred materials are white opaque or translucent materials but transparent materials and colored opaque, translucent or transparent materials could be useful in special applications.

Typical thicknesses of the substrate are in the range of 0.05 to 0.75 mm. However, the thickness can be outside this range and almost any thickness can be useful provided the film resists tearing or splitting during the printing and application process. Given all considerations, any thickness is useful provided the substrate is not too thick to feed into an electrostatic printer of choice.

Conductive Layer

For electrostatic imaging on film 10, a conductive coating layer 14 is provided from an organic solvent-based conductive coating solution on the upper major surface of film substrate 12. In direct contrast to the teaching of the Japanese Kokai Publication No. 3-69960 described above, the organic solvent-based conductive coating solution does not swell conformable substrates used in the present invention. Furthermore, conductive coating solutions employing organic solvents are used to assure that the conductive layer has good ply adhesion with the conformable substrate surface. Also, use of organic solvents in the conductive coating solutions permit the conformable substrate to avoid any priming of its upper major surface to receive the conductive layer. Better wettability can be achieved on an unprimed substrate, to avoid foaming caused by aqueous based coating solutions.

The conductive coating layer can be electronically conductive or ionically conductive. Electronically conductive layers employ a plurality of particles of a transparent, electrically conductive material such as antimony doped tin oxide or the like, disposed in a polymeric matrix.

Attributes of conductive layer 14 include adhesion to film substrate 12, deposition using a suitable solvent system, and moisture insensitivity after the layer 14 is dried on substrate 12.

When an electrically conductive layer is desired, conductive layer 14 is prepared from a solution of a conductive formulation that generally comprises a binder, conductive pigments, dispersant, and organic-based solvent, the latter of which is removed during the manufacturing process.

The weight percent of solids to organic solvent in the conductive formulation can range from about 10 to about 40, with about 25 weight percent being presently preferred for ease of application to film substrate 12.

After coating of conductive formulation on film substrate 12 and evaporation or other removal of organic solvent, the thickness or caliper of the conductive layer 14 can range from about 2 to about 5 µm with about 3 µm being presently preferred.

As stated above, the conductive layer 14 should have a surface resistance ranging from about 0.2 to about 3 megaohms per square. This level of surface resistance provides the proper level of conductivity to form the ground plane for the direct print film of the present invention.

Non-limiting examples of binders include acrylics, polyester, and vinyl binders. Among acrylic binders, carboxylated acrylate binders and hydroxylated acrylate binders are useful for the present invention, such as those commercially available from Allied Colloids of Suffolk, Va. such as "Surcol SP2" carboxylated acrylate binder and "Surcol SP5 hydroxylated acrylate binder. Among some of the polyesters materials which can be employed as binders are materials sold by Goodyear of Akron, Ohio under the brand "Vitel", of which grades PE222 and PE200 are particularly suitable for use in the present invention. Also vinyl resins such as "UCAR" "VAGD" brand resins from Union Carbide of Danbury, Conn. can also be useful.

Conductive pigments can include antimony-containing tin oxide pigments or other pigments such as indium doped tin oxide, cadmium stannate, zinc oxides, and the like.

Non-limiting examples of antimony-containing tin oxide conductive pigments include those pigments disclosed in U.S. Pat. No. 5,192,613 (Work, III et al.); U.S. Pat. No. 4,431,764 (Yoshizumi); U.S. Pat. No. 4,965,137 (Rut); U.S. Pat. No. 5,269,970 (Ruf et al.); and in product literature for "Tego S" pigments commercially available from Goldschmidt AG of Essen, Federal Republic of Germany and "Zelec" pigments commercially available from DuPont of Wilmington, Del. When the Goldschmidt Tego S conductive pigment is employed, its particle size should be reduced by a milling process.

Particle size of the conductive pigments in the conductive layer 14 can range from about 0.02 to about 10 µm. Below about 0.02 µm particle size, the conductive pigment is too easily imbibed with solvent action, whereas at greater than 10 µm, the coating of dielectric layer 16 on the conductive layer 14 limits protrusion of the conductive pigment particles into the dielectric layer 16.

Preferably, the average particle size can range from about 0.5 µm to about 4 µm, with particles of about 1 µm being most preferred.

The bulk powder resistivity can range from about 2 to about 15 Ohm-cm with about 2 to about 10 Ohm-cm being preferred and about 6 to about 7 Ohm-cm being presently preferred. With the DuPont pigments, the bulk powder resistivity can be about 2–5 Ohm-cm for "Zelec 3410-T" pigments and 4–15 Ohm-cm for "Zelec 2610-S" found acceptable for the present invention. The bulk powder resisitivity has been found to be important in controlling the final appearance of the image on the direct print film because materials that are too resistive require the use of a larger amount of conductive pigment can cause an objectionable amount of background color in the final image.

The "Tego S" particles are identified to have a specific resistance of 10, which is believed to compute to about bulk powder resistivity of about 10.

The present invention preferably uses antimony-containing pigments which have antimony intimately mixed with tin oxide, that is, present in the form of an antimony and tin oxide coating on silicon containing particles (believed to be typified by the DuPont materials and disclosed in the Work III, et al. patent identified above) or in the form of antimony doped through a lattice of tin oxide particles (believed to be typified by the Tego materials and disclosed in the Ruf and Ruf et al. patents identified above), as compared with antimony—tin oxide reacted materials (believed to be typified by the Mitsubishi materials described in Yoshizumi patent identified above). While not being limited to a particular theory, better bulk powder resistivity within the acceptable range is achieved by antimony and tin oxide coatings or antimony doped into tin oxide lattices that create "intimately mixed" antimony with tin oxide, as opposed to particles of antimony reacted with tin oxide.

A variety of surfactant materials can be employed as dispersants for the conductive layer 14 in the present invention, including nonionic and anionic dispersants. In general, anionic dispersants are most preferred, although the invention is not limited thereto. One particularly preferred anionic dispersant is a material branded "Lactimon" dispersant from BYK-Chemie USA Corporation of Wallingford, Conn. Also commercially available from BYK-Chemie USA Corporation is a nonionic dispersant is branded "Anti Terra U" dispersant.

Non-limiting examples of solvents for the conductive formulation include ethyl acetate and ethanol.

Formulations of the conductive layer 14 require a weight ratio from about 5:1 to about 1:1 of pigment:binder with a preference of a weight ratio of 3:1 pigment:binder. When "Tego S" conductive pigment is employed, the weight ratio can range from about 3.0:1 to about 4.7:1 pigment:binder. When the DuPont "Zelec" conductive pigment is employed, the weight ratio can range from about 1:1 to about 4:1 pigment:binder.

When the pigment to binder ratio falls below 1:1, there is inadequate bulk conductivity of layer 14. When the weight ratio of pigment:binder exceeds about 5:1, there is insufficient cohesive strength of the layer 14 on film substrate 12.

Dielectric Layer

Dielectric layer 16 can be coated on conductive layer 14 to provide the electrostatic capacitance required for electrostatic imaging.

The dielectric layer 16 is of relatively high electrical resistivity and contributes to the performance of film 10 for direct printing of images electrostatically. In addition to providing the interface of film 10 with the recording head and toner, dielectric layer 16 covers and protects conductive layer 14 and provides the top surface for film 10.

A variety of imaging defects can be attributed to incorrect properties of a dielectric layer in electrostatic or electrographic imaging processes. Dielectric layer 16 is constructed to minimize imaging defects. Some of the noted defects include image flare, which results from unwanted electrostatic discharge within the recording medium; image drop out, which occurs when a portion of the image is not printed onto the medium; and shorting between nibs on the imaging head because the head is not kept sufficiently clean by a dielectric layer of passing recording medium past the nibs over time.

Dielectric layer 16 is coated on layer 14 from a dielectric formulation that comprises particulate matter of both spacer particles and abrasive particles, preferably in particular ratios dispersed in a binder.

Both the spacer particles and the abrasive particles should be selected with consideration to the refractive index thereof, so as to provide index matching to the remainder of dielectric layer 16 and film 10. In this manner, film 10 has a uniform appearance. This is especially so when transparent products are desired. In the case of opaque products, a uniform appearance would not be critical.

The spacer particles can be fabricated from a material having sufficient rigidity to withstand coating and handling, but need not be highly abrasive. Nonlimiting examples of materials useful as spacer particles include relatively soft materials such as a polymer or a mineral such calcium carbonate or relatively hard materials such as silica or glass, provided that such relatively hard materials have a relatively rounded configuration. More particularly, useful spacer particles can be made from synthetic silicas, glass micro beads, natural minerals (e.g., calcium carbonate), polymeric materials such as polypropylene, polycarbonate, fluorocarbons or the like.

Typically spacer particles have an average size ranging from about 1 to about 15 µm, and preferably below about 10 µm. In general, spacer particles will be present in a distribution of sizes, although it is most preferred that the particles remain in a size range of about 3–10 µm.

One particularly preferred group of spacer particle materials comprise amorphous silica, of which is most preferred the synthetic, amorphous silicas sold by the W. R. Grace Corporation under the brand "Syloid 74". These materials have an average particle size of approximately 3.5–7.5 µm as measured on a Coulter apparatus and an average particle size of 6–10 µm as measured on a Malvern analyzer. One specific member of this group of materials comprises "Syloid 74 X-Regular" particles which have an average particle size of 6.0 as measured on a Coulter apparatus.

Abrasive particles useful for dielectric layer 16 of the present invention are provided to assure that the performance of spacer particles and abrasive are effectively decoupled so as to provide an optimized dielectric medium.

The abrasive particles will generally be harder than the spacer particle material chosen and will usually have a more irregular configuration or texture than the spacer particle material. Among some of the preferred abrasive materials are silica materials such as microcrystalline silica and other mined or processed silicas, as well as other abrasives such as carbides and the like.

The abrasive particles generally have the same size range as the spacer particles, typically in the range of about 1 to about 15 µm and preferably less than 10 µm.

One particularly preferred group of abrasive materials comprises mined, microcrystalline silica sold under the brand "Imsil" by Unimin Specialty Minerals, Inc. of Elko, Ill. These materials comprise 98.9% silica with minor amounts of metal oxides. One grade having particular utility comprises "Imsil A-10" which has a median particle size of 2.2 µm, and range of particle sizes such that 99% of the particles have a size less than 10 µm and 76% of the particles have a size of less than 5 µm.

The proportion of spacer particles to abrasive particles are such that the spacer particles are present in a larger amount. Preferably, the ratios of spacer to abrasive particles fall within the range of about 1.5:1 to about 5:1. Most preferably, the ratio of spacer to abrasive particles is approximately 3:1.

The spacer particles and abrasive particles are disposed is a binder which generally comprises a polymeric resin. The resin should be of fairly high electrical resistivity, and should be compatible with both types of particles and the toner. The resin should have sufficient durability and flexibility to permit it to function in the electrostatic imaging process and should be stable in ambient atmospheric conditions.

There are large number of resins that meet these criteria. One preferred group of materials are the acrylic copolymers of the type commercially available from Rohm and Haas of Philadelphia, Pa. under the brand "Desograph-E342-R".

A coating mixture to prepare dielectric layer 16 can employ solvents such toluene into which the binder, spacer particles, and abrasive particles can be added as solids. The range of total solids in the coating mixture can be from 10 to about 35 and preferably about 15 to 25 weight percent of the total coating mixture. Of the total solids, the binder solids can comprise from about 93 to about 78 and preferably 82 weight percent. Of the total solids, the particles solids (preferably in a 3:1 spacer:abrasive mixture) can comprise from about 7 to about 22 and preferably 18 weight percent.

The particle solids for the coating mixture can be blended by ball milling for approximately two hours at room temperature. Under these conditions, there is no significant reduction in particle morphology, and the ball milling process only serves to mix and disperse the particles. Other processes could be employed.

Surface roughness is desired to provide topography for deposition of toner particles is based on a Sheffield method measurement described in TAPPI Test T 538 om-88 published by the Technical Association of the Pulp and Paper Industry of Atlanta, Ga., incorporated herein by reference.

The dielectric layer 16 can have a surface roughness ranging from about 50 to about 200 Sheffield units and preferably from about 80 to about 180 with 140 being presently preferred.

Optional Pressure Sensitive Adhesive

Any conventional pressure sensitive adhesive used for the construction of image graphic films can be used with the films 10 of the present invention. The field 18 of the pressure sensitive adhesive can be coated on film substrate 12 prior to, or contemporaneous with, construction of the film 10 of the present invention.

Non-limiting examples of pressure sensitive adhesives useful with the present invention include those adhesives described in U.S. Pat. Nos. Re. 24,906 (Ulrich); 2,973,826; Re. 33,353; 3,389,827; 4,112,213; 4,310,509; 4,323,557; 4,732,808; 4,917,929; 5,141,790 (Calhoun et al.); 5,229,207 (Paquette et al.); and 5,296,277 (Wilson et al.) and European Publication 0 051 935, the disclosures of which are incorporated by reference herein. A presently preferred adhesive is an acrylate copolymer pressure sensitive adhesive formed from a 90/10 weight percent monomer ratio of 2-methylbutyl acrylate/acrylic acid in a 65/35 heptane/acetone solvent system (39–41% solids) and having an inherent viscosity of about 0.7–0.85 dl/g.

A line of commercially available film substrate with an optional pressure sensitive adhesive of those described above is Scotchcal™ Marking Films, especially Scotchcal™ 3650 Marking Films. Thus, one can construct direct print films of the present invention from these commercially available films with the addition of the conductive and dielectric layers described above.

Thickness of adhesive 18 can range from about 0.012 mm to about 1 mm with a thickness of about 0.025 mm (1 mil) being preferred.

Optional Liner

Liner 20 can be constructed from any conventional release liner known to those skilled in the art for image graphic media. Non-limiting examples include Polyslik™ release liners commercially available from Rexam Release of Oak Brook, Ill. and polyester liners such as a 0.096 mm polyethylene terephthalate film with a matte backside coating on one major surface and on the other major surface, a vanadium oxide/surfactant/sulfopolyester antistatic primer coating and a condensation cure silicone exterior coating. These antistatic coatings are generally described in U.S. Pat. No. 5,427,835 (Morrison et al.), the disclosure of which is incorporated by reference herein.

Conductive Grounding Stripe

Referring again to FIG. 1., a pair of electroconductive ground stripes 22 and 24 can be provided in order to aid in the prevention of "leading edge fog" by providing an avenue for residual charge to be eliminated from the ground plane. These stripes 22 and 24 ranging from about 0.76 to about 2.54 mm wide are applied to dielectric layer 16 at opposing lateral edges of film 10.

Stripes 22 and 24 can be made from a conductive ink sold under the brand "Multifilm, Conductive Black Ink 9093E20J" from Raffi and Swanson of Wilmington, Mass. and are configured to permeate dielectric layer 16 at such lateral edges of film in order to provide an electrical ground to the conductive layer 12.

Thus, a film 10 of the present invention can have in sequential order, a release liner 20 comprising from about 0.07 to about 0.15 mm (about 3 to about 6 mils) thickness, a field of pressure sensitive adhesive 18 comprising about 0.03 mm (about 1 mil) thickness, a film substrate 12 comprising from about 0.05 to about 0.10 mm (about 2 to about 4 mils) thickness, a conductive coating layer 14 comprising from about 1 to about 5 micrometers (0.04–0.2 mils), a dielectric layer 16 comprising from about 2 to about 4 micrometers (0.08–0.16 mils) thickness, and a pair of electroconductive ground stripes 22 and 24 at lateral edges of film 10 that permeate layer 16 to layer 14.

Method of Forming Films of the Present Invention

A preferred method of constructing films of the present invention comprises a modular construction, but can comprise a sequential construction. In the sequential construction, beginning with release liner 20, each of the layers 18, 16, 14 and 12 are built on top of release liner 20.

Preferably, the method of the present invention employs a modular construction wherein the first step is the casting of a film organosol onto a temporary release liner, followed by fusing the organosol to form a substrate 12 according to techniques known to those skilled in the art. In an independent module, the field of pressure sensitive adhesive 18 is east on release liner 20 according to techniques to those skilled in the art. Then, the module of film substrate 12 on the temporary liner is joined with the module of field of pressure sensitive adhesive 18 on liner 18 and the temporary liner is discarded.

Alternatively, one can employ a commercially available pressure sensitive adhesive-backed polymeric film in substitution for the above described modular construction.

Conductive layer 14 can be coated on film substrate 12 using any technique known to those skilled in the art, preferably a wire bar coating technique as known to those skilled in the art. The # wire bar of from about 6 to about 40 is used to achieve the 1–5 micrometer thickness described as suitable for layer 14, with a #10 wire bar being useful for DuPont conductive particles and a #12 to #40 wire bar being useful for Tego conductive particles. The wire bar coating process step can operate at a line speed ranging from about 9 meters per minute to about 19 meters per minute and preferably about 12 meters per minute (40 feet per minute).

Dielectric layer 16 is coated on conductive layer 14 according to coating techniques known to those skilled in the art, preferably a reverse gravure coating of the dielectric layer 16 onto conductive layer 14. In those instances where a wire bar is utilized, the total solids are preferably about 16 weight percent. Where a reverse gravure process is employed, the total solids are preferably about 25 weight percent. The ruling mill cylinder having a theoretical "lay down" factor of about 0.031 mm to about 0.078 mm is used to achieve the 1.5–5 micrometer thickness described as suitable for layer 16 with 3 micrometer thickness being preferred. The reverse gravure coating process step can operate at a line speed ranging from about 1.5 to about 62 meters per minute, and preferably about 15 meters per minute. The reverse gravure can operate at a roll ratio ranging from about 0.5 to about 1.5, and preferably about 1.0.

When ground stripes 22 and 24 are employed, such stripes can be applied to lateral edges of film 10 using techniques known to those skilled in the art, preferably an offset gravure or flexographic coating of stripes 22 and 24. Stripes 22 and 24 permeate layer 16 at such lateral edges to create a ground path from stripes 22 and 24 to layer 14. The offset gravure or flexographic coating process step can operate at a line speed ranging from about 12 meter per minute to about 31 meters per minute, and preferably about 15 meters per minute (50 feet per minute).

After imaging, film 10 can be protected with overlaminate films. Nonlimiting examples of overlaminate films suitable for use with films 10 of the present invention include Scotchprint™ Nos. 8910 and 8912 films commercially available from the Commercial Graphics Division of 3M Company.

Usefulness of the Invention

The ability to provide a direct printing of an electrostatically printed image on a durable film substrate opens a wide variety of opportunities to one skilled in the art of electrostatic printing using digital imaging techniques.

One can eliminate the necessity of using an non-durable, temporary substrate for transfer to a durable film substrate via a heat/pressure lamination according to the processes described in U.S. Pat. Nos. 5,114,520 (Wang et al.) and 5,262,259 (Chou et al.), the disclosures of which are incorporated by reference herein.

The films of the present invention are conformable due to the conformable nature of the substrates selected and the conformable adhesive layer contacting one major surface of the substrate and the conformable conductive and dielectric layers contacting the opposite major surface of the substrate. Preferably, a conformable substrate in a direct print film exhibits a yield point and/or permanent strain when subjected to a maximum tensile stress of about $3.5 \times 10^7 N/m^2$ (2000 lbs./square inch) at room temperature according to ASTM D638-94b (1994), when the caliper used for the test includes the total cross-sectional thickness of the substrate, the thickness of the adhesive, and the thicknesses of the conductive layer and dielectric layer. More preferably, the maximum tensile stress limit is about $1.4 \times 10^7 N/m^2$ to provide more conformable films. Most preferably, the maximum tensile stress limit is about $7 \times 10^6 N/m^2$ to provide even more conformable films. Conformability of the films still require internal integrity. Desirably, the minimum tensile stress limit is about $6.9 \times 10^4 N/m^2$ (10 lbs./square inch) and preferably the minimum tensile stress limit is about $1.7 \times 10^5 N/m^2$ (25 lbs./square inch).

Films 10 of the present invention can provide an average color density as measured according to a "Reflective Optical Density of a Status T Method" under the requirements of ANSI/ISO 5/3-1984, ANSI PH2. 18-1985 published by the Graphic Communications Association of Arlington, Va. of from about 1.0 to about 1.6 O.D. Units. Preferably, the average color density ranges from about 1.3 to about 1.5 O.D. Units. These values show that films 10 of the present invention has an excellent color imaging capability after electrostatic printing directly onto film 10 using electrostatic printers otherwise used for the processes described in Wang et al. and Chou et al. above.

Films 10 of the present invention can provide a Base Color Shift as evaluated using a Hunter Colorspace measuring colorimeter of from about −2 to about −7 Darkness/Lightness Units as compared to Scotchcal™ 3650 Marking Film commercially available from 3M Company. This color shift is intended to show how little difference in relative whiteness the films 10 of the present invention differ from a commercially available marking film that is useful in the heat/pressure lamination step of the Wang et al. or Chou et al. processes.

Films 10 of the present invention can provide a 60° Gloss from about 2 to about 30, with about 7 being preferred. 60° Gloss can be measured as described in ASTM D2457-90 (1990).

For an appreciation of the scope of the present invention, the examples and testing methods follow.

Testing Methods

Bulk Powder Resistivity: "The Application of ZELEC ECP in Static Dissipative Systems" (Du Pont Chemicals, Deepwater, N.J. September 1992)

Specific Resistance: "Tego Conduct S Resisitivity Measurement and Apparatus" (available from Esprit Chemical Company, Rockland, Md.)

Surface Resistance: ASTM D 4496-87 and ASTM D 257-93 published by American Society for Testing and Materials.

Color Shift: ASTM D 2244-93 published by American Society for Testing and Materials.

Color Density: "Reflective Optical Density on a Status T Method"" under the requirements of ANSI/ISO 5/3-1984, ANSI PH2. 18-1985 published by the Graphic Communications Association of Arlington, Va.

Sheffield: Sheffield method measurement described in TAPPI Test T 538 om-88 published by the Technical Association of the Pulp and Paper Industry of Atlanta, Ga.

The disclosures of the Testing Methods are incorporated herein by reference.

EXAMPLES

The coating mixtures for the conductive layer is prepared for all of the examples according to details below and identified in Table 1, subject to the following common techniques employed.

Example 1 was prepared by mixing 85 parts ethanol, 35 parts ethyl acetate, 45 parts of Surcol SP-2 binder at 50% total solids until a clear solution was achieved. Then with good agitation, 14 parts of Zelec ECP 2601-S particles (silicon dioxide core with antimony doped tin oxide coating) was slowly added, followed by stirring for more than one hour. Then the solution was transferred to a "Kady Mill" and milled for 30 minutes. The coating solution was applied to unprimed polyvinyl chloride substrate. Coating was at about 800 m/hr. with oven drying at 93° to 132° C. for 1 minute.

Example 2 was prepared as Example 1, except that after stirring, 4.5 parts of Cymel 301 modified melamine-formaldehyde resin (Cytec Industries, Inc. of West Paterson, N.J.) was added just prior to coating on the substrate.

Example 3 was prepared as Example 1, except that the pigment was 25 parts of Zelec ECP 3610-S particles (silicon dioxide core with antimony doped tin oxide coating).

Example 4 was prepared by mixing 200.5 parts ethanol, 89.0 parts ethyl acetate, 48.0 parts of Surcol SP-2 binder and 9.0 parts Lactimon dispersant (Byk Chemie of Wallingford, Conn.) until a clear solution was achieved. Then with good agitation, 73.5 parts of Zelec ECP 3410-T particles (silicon dioxide core with antimony doped tin oxide coating) was slowly added, followed by stirring for more than thirty minutes. Then the solution was transferred to a "Kady Mill" and milled for 30 minutes. The coating solution was applied to unprimed polyvinyl chloride substrate. Coating was at about 800 m/hr. with oven drying at 93° to 132° C. for 1 minute.

Example 5 was prepared by mixing 164 parts ethanol, 100 parts ethyl acetate, 44 parts of Surcol SP-2 binder and 12 parts Lactimon dispersant (Byk Chemie of Wallingford, Conn.) until a clear solution was achieved. Then with good agitation, 104 parts of Esprit "Tego Conduct 'S-10'" particles (Goldschmidt) (antimony doped tin oxide particles) was slowly added, followed by stirring for more than thirty minutes. Then the solution was transferred to a ball mill fitted with smooth stone grinding media and ball milled for 12 hours. Then 330 parts of that solution was combined with 100 parts of a 50/50 ethyl acetate/ethanol solvent and 20 parts Surcol SP-2 binder to form the coating solution. The coating solution was applied to unprimed polyvinyl chloride substrate. Coating was at about 800 m/hr. with oven drying at 93° to 132° C. for 1 minute.

Example 6 was prepared in the same manner as Example 5, except that a second commercial formulation Tego S-10 (now renamed as Tego S by the vendor) was used.

Comparative Example A was prepared by mixing 62 parts ethanol, 25 parts ethyl acetate, 25 parts of Surcol SP-2 binder, and 1.5 parts Lactomin dispersant until a clear solution was achieved. Then with good agitation, 37 parts of Zelec ECP 3010 XC particles (tin oxide particles with an antimony coating) was slowly added, followed by ball milling for more than 12 hours to prepare a coating solution. Then 100 parts of this coating was combined with 60 parts ethanol and 40 parts ethyl acetate to yield a final coating solution. Then this coating solution was placed in a Kady mill for 20 minutes. Then the coating solution was applied to unprimed polyvinyl chloride substrate. Coating was at about 800 m/hr. with oven drying at 93° to 132° C. for 1 minute.

Comparative Example B was prepared by mixing 20 parts of methyl isobutyl ketone, 20 parts toluene, 12 parts "UCAR VAGD" vinyl resin binder (Union Carbide) until a clear solution was obtained. Then 108 parts of butyl acetate and 4 parts of Lactimon dispersant were added. Then with good agitation, 40 parts of Zelec ECP-3410-T particles was slowly added and stirred for 30 minutes. Then the coating was transferred to a Kady mill for 30 additional minutes. Then the coating solution was applied to unprimed polyvinyl chloride substrate. Coating was at about 800 m/hr. with oven drying at 93° to 132° C. for 1 minute.

Comparative Example C was prepared by mixing 27.45 parts ethanol, 11.25 parts ethyl acetate, 10.70 parts of Surcol SP-2 binder and 1.35 parts Lactimon dispersant until a clear solution was achieved. Then with good agitation, 25 parts of Esprit "Tego Conduct 'S'" particles (Goldschmidt) (antimony doped tin oxide particles) was slowly added, followed by stirring for more than thirty minutes. Then the solution was transferred to a ball mill fitted with smooth stone grinding media and ball milled for 60 hours. Then that solution was diluted with a 50/50 ethyl acetate/ethanol solvent. The coating solution was applied to unprimed polyvinyl chloride substrate. Coating was at about 800 m/hr. with oven drying at 93° to 132° C. for 1 minute.

The coating mixture for the dielectric layer is prepared for all examples according to the following method.

A concentrate of coating material for the fabrication of dielectric layer was prepared using a 3:1 blend of spacer to abrasive particles disposed in an acrylic copolymer matrix. The spacer particles comprised the "Syloid 74 X-Regular" amorphous silica material described above. The abrasive particles comprised the "Imsil A-10" mined microcrystalline silica described above. The resin comprised the "Desograph-E342-R" acrylic copolymer resin described above. The mixture was 34.4 weight percent solids in toluene. The solids component comprised 67 weight percent binder resin and 33 weight percent particles solids (in the 3:1 ratio described above). The particle solids were blended by ball milling for approximately two hours at room temperature. The particle solids were then mixed with binder resin to produce a stock solution of one part of particle solids and one part of a toluene based solution of the resin having 57 weight percent solids. The stock solution was prepared by blending the foregoing together at room temperature and the resultant solution comprised 45.8 weight percent total solids in toluene. Alternatively, a second stock solution was made. None of the examples used this stock solution, but it has proved to be useful in further experimentation. The particle solids were mixed with binder resin to produce a stock solution of two parts of particle solids and one part of a toluene based solution of the resin having 57 weight percent solids. The blending occurred at room temperature, and the resultant solution comprised 41.9 weight percent total solids in toluene.

In those examples where a wire bar coater was used, the stock solution was diluted with a 50:50 blend, by volume, of toluene and methyl ethyl ketone in an amount sufficient to reduce the solids contents thereof to approximately 16.7 weight percent (i.e., 14.6 weight percent polymer and 2.1 weight percent particles). The resultant solution had a viscosity below 10 centipoise.

In those examples where a reverse gravure coating process was used, the stock solution was diluted so that the resultant solution had a solids content of 25 weight percent (i.e., 20 weight percent polymer and 5 weight percent particles).

Table 1 shows the construction of Examples 1–6 and Comparative Examples A–C for a variety of conductive layers 14 and a variety of dielectric layers 16 on Scotchcal™ 3650 Marking Films. Conductive layers 14 were coated using a wire bar as noted. Dielectric layers 16 were coated using a reverse gravure process using a ruling mill cylinder having a theoretical "wet laydown" of 0.07 mm of a 25% solids solution to achieve a wet coating thickness of about 3 µm, or a wire rod process as noted.

Table 2 shows the key properties of films 10 for each of the Examples and Comparative Examples such as Surface Resistance of both conductive layers 14 and dielectric layers 16, Color Shift, Color Density, and Sheffield surface roughness. Also, Table 2 shows a qualitative explanation of the ply adhesion and imaging quality of films 10. Ply adhesion refers to the adhesion of the conductive layer to the conformable substrate. Imaging was tested using Scotchprint™ brand Electronic Graphics System toners and a four-color, single pass electrostatic printer branded as a 9512 printer commercially available from Nippon Steel Corporation of Tokyo, Japan.

TABLE 1

| Example | Conductive Pigment | Bulk Powder Resistivity Ω-cm | Conductive Layer Binder | Pigment:Binder Ratio | Solvent | Conductive Layer Wire Bar # | Dielectric Layer |
|---|---|---|---|---|---|---|---|
| 1 | DuPont Zelec 2610 S | 2–15 | Allied Colloids Surcol SP-2 | 0.64:1 | Ethanol/Ethyl Acetate 2.4/1 | #20 | Wire Bar # 20 |
| 2 | DuPont Zelec 2610 S Crosslinked with Cymel 301 | 2–15 | Allied Colloids Surcol SP-2 | 0.64:1 | Ethanol/Ethyl Acetate 2.4/1 | #20 | Wire Bar # 20 |
| 3 | DuPont Zelec 3610 S | 4–15 | Allied Colloids Surcol SP-2 | 1.7:1 | Ethanol/Ethyl Acetate 2.4/1 | #20 | Reverse Gravure |
| 4 | DuPont Zelec 3410 T | 2–5 | Allied Colloids Surcol SP-2 | 3:1 | Ethanol/Ethyl Acetate 2.25/1 | #16 | Reverse Gravure |
| 5 | Tego S-10 (First Commercial Formulation) | 10 (Specific Resistance) | Allied Colloids Surcol SP-2 | 4.7:1 | Ethanol/Ethyl Acetate 1.39/1 | #30 | Wire Bar # 20 |
| 6 | Tego S-10 Second Commercial Formulation) | 10 (Specific Resistance) | Allied Colloids Surcol SP-2 | 3:1 | Ethanol/Ethyl Acetate 1.39/1 | #30 | Reverse Gravure |
| A | DuPont Zelec 3010 XC | | Allied Colloids Surcol SP-2 | 3:1 | Ethanol/Ethyl Acetate 2.4/1 | #16 | Wire Bar # 20 |
| B | DuPont Zelec 3410 T | 2–5 | VAGD (solution grade UCAR vinyl resin from Union Carbide Corp.) | 3.3:1 | Methyl Isobutyl Ketone/Toluene/ Butyl Acetate 1/1/5.1 | #16 | Reverse Gravure |
| C | Tego S | 10 (Specific Resistance) | Allied Colloids Surcol SP-2 | 3:1 | Ethanol/Ethyl Acetate 2.4/1 | #30 | Reverse Gravure |

TABLE 2

| Example | Surface Resistance (MΩ) | Base Color Shift (ΔL Compared to Scotchcal™ 3650 Film)* | Color Density (O..D. Units) | Qualitative Comments |
|---|---|---|---|---|
| 1 | 1.5 | Fair | 1.17 | Fair/Good Imaging |
| 2 | 1.0 | Fair | 1.07 | Fair Imaging |
| 3 | 0.8 | Fair | 0.88 | Poor Imaging |
| 4 | <1 | –10.6 | 1.25 | Very Good Imaging |
| 5 | <3 | –6.9 | 1.25 | Very Good Imaging But Poor Ply Adhesion |
| 6 | 2.5 | –4.3 | 1.34 | Very Good Imaging and Ply Adhesion |
| A | 1 | Extremely Dark | 0.97 | Fair/Poor Imaging |
| B | 1.5 | –12.6 | 0.72 | Poor Imaging |
| C | 20 | –2.3 | — | Poor Conductivity |

The results from Table 2 show that the type of binder and the type of conductive pigment vary the results for direct print films. Without undue experimentation, one skilled in the art can employ the variations shown in the examples to provide an acceptable direct print film according to the present invention.

Example 6 presents the preferred direct print film of the present invention in part because of strength of ply adhesion of the conductive layer to the conformable substrate. Examples 1–5 are also acceptable for direct print films because of acceptable to very good imaging.

The scope of the invention is indicated by the following claims.

What is claimed is:

1. A direct print film, comprising a durable, conformable, polymeric substrate having a conductive, electrostatic printable layer comprising conductive pigment particles having a size ranging from about 0.5 μm to about 4 μm, wherein the conductive layer contacts a major surface of the substrate and wherein a pressure sensitive adhesive contacts a second major surface of the substrate.

2. The film according to claim 1, wherein the polymeric substrate is clear, translucent, or opaque.

3. The film according to claim 1, wherein the conductive pigment particles comprise antimony intimately mixed with tin oxide.

4. The film according to claim 3, wherein the conductive layer further comprises a binder of an acrylic material.

5. The film according to claim 4, wherein the particles are antimony doped tin oxide.

6. The film according to claim 5, wherein the conductive layer has a surface resistance ranging from about $2.0 \times 10^5$ to about $3 \times 10^6$ Ohms/□.

7. The film according to claim 6, wherein the particles of antimony doped tin oxide in the conductive layer have a bulk powder resistivity ranging from about 2 Ohm-cm to about 15 Ohm-cm.

8. The film according to claim 3, further comprising a dielectric layer contacting the conductive layer.

9. The film according to claim 8, wherein the dielectric layer comprises spacer particles and abrasive particles with the ratio of spacer particles to abrasive particles present within a range of about 1.5:1 to about 5:1.

10. A direct print film, comprising:
a vinyl-containing polymeric substrate having a conductive layer coated thereon, wherein the conductive layer comprises a carboxylated acrylic binder and a conductive pigment particles having a size ranging from about 0.5 μm to about 4 μm and comprising antimony doped tin oxide, wherein the conductive layer has a surface resistance ranging from about $2.0 \times 10^5$ to about $3 \times 10^6$ Ohms/□ and wherein the particles of antimony doped tin oxide in the conductive layer have a bulk powder resistivity ranging from about 2 Ohm-cm to about 15 Ohm-cm.

11. The direct print film according to claim 10, wherein the polymeric substrate is clear, translucent, or opaque.

12. The film according to claim 10, the conductive layer contacts a major surface of the substrate.

13. The film according to claim 12, wherein the conductive layer further comprises a binder of an acrylic material.

14. The film according to claim 12, further comprising a dielectric layer contacting the conductive layer.

15. The film according to claim 14, wherein the dielectric layer comprises spacer particles and abrasive particles with the ratio of spacer particles to abrasive particles present within a range of about 1.5:1 to about 5:1.

16. The film according to claim 12, further comprising pressure sensitive adhesive contacting a second major surface of the substrate.

17. A direct print film, comprising a durable, conformable, polymeric substrate having on a major surface a conductive layer coated thereon, and a dielectric layer coated on the conductive layer, wherein the conductive layer comprises a conductive pigment particles having a size ranging from about 0.5 µm to about 4 µm and comprising intimately mixed antimony and tin oxide, wherein the dielectric layer comprises spacer particles and abrasive particles with the ratio of spacer particles to abrasive particles present within a range of about 1.5:1 to about 5:1.

18. The film according to claim 17, wherein the conductive pigment has a bulk powder resistivity ranging from about 2 Ohm-cm to about 15 Ohm-cm.

19. The film according to claim 17, wherein the conductive layer further comprises a binder of an acrylic material.

20. The film according to claim 19, wherein the conductive layer has a surface resistance ranging from about $2.0 \times 10^5$ to about $3 \times 10^6$ Ohms/□.

* * * * *